United States Patent [19]

Thomas

[11] Patent Number: 4,495,538

[45] Date of Patent: Jan. 22, 1985

[54] CONTACTOR APPARATUS COMPRISING MEANS FOR AUTOMATICALLY OPENING POWER CIRCUITS AND A LOCAL CONTROL DEVICE

[75] Inventor: Christian Thomas, Montesson, France

[73] Assignee: La Telemecanique Electrique, France

[21] Appl. No.: 440,382

[22] Filed: Nov. 9, 1982

[30] Foreign Application Priority Data

Nov. 9, 1981 [FR] France ................................ 8120919

[51] Int. Cl.³ ........................ H02H 1/00; H01H 71/10

[52] U.S. Cl. .................................... 361/115; 361/139; 335/6; 200/DIG. 42

[58] Field of Search ...................... 335/6, 16, 132, 175, 335/41, 38, 195, 196; 361/102, 139, 194, 206, 115; 219/10.55 C; 200/67 PK, DIG. 42; 307/131, 132 M, 139

[56] References Cited

U.S. PATENT DOCUMENTS 3,921,109 11/1975 Hodgson ............................ 335/195
3,940,723 2/1976 Horikawa ............................ 335/195
4,077,026 2/1978 Slade et al. ............................ 335/16
4,149,053 4/1979 Long ............................ 200/DIG. 42
4,247,745 1/1981 Wilson ............................ 200/DIG. 42
4,258,343 3/1981 Kussy ............................ 335/16
4,400,670 8/1983 Mostosi ............................ 335/6

FOREIGN PATENT DOCUMENTS 428469 5/1965 Japan ............................ 335/16

*Primary Examiner*—E. A. Goldberg
*Assistant Examiner*—George Andrews
*Attorney, Agent, or Firm*—William A. Drucker

[57] ABSTRACT

A contactor apparatus comprising means for automatically opening power circuits should faults occur and a local control member.

This apparatus comprises a plurality of power lines (8) each comprising a power contact (2) adapted to be opened during a short circuit by a striker (28), a coil (13) and a bimetallic strip (14), responding to smaller overloads. The elements responsive to overcurrents act on a cascade of sudden tripping devices (19) (17) (31) which govern the positions of the local control member (18) and act on a control switch (4) placed in series with the electromagnet (1).

Such an apparatus is advantageously used in installations where protection of the lines, remote control and local control of the consumer apparatus are desired.

10 Claims, 5 Drawing Figures

CONTACTOR APPARATUS COMPRISING MEANS FOR AUTOMATICALLY OPENING POWER CIRCUITS AND A LOCAL CONTROL DEVICE

BACKGROUND OF THE INVENTION

The invention relates to a contactor apparatus comprising an electromagnet controlling power contacts and having means for automatically opening these power contacts each of which responds, on the one hand, to the appearance of short circuit currents in one of the power circuits through a coil and a striker and, on the other hand, to the appearance of overload currents either instantaneous or of a longer duration through a coil associated with a plate and, respectively with a bimetallic strip, each power contact being adapted to cooperate, after striking, with a locking member which holds it in the open position, this apparatus having a local member adapted to reset the automatic opening means and to close again a control switch placed in series with the coil of the electromagnet.

Such contactors, which are intended for ensuring simultaneously the power supply of consumer apparatus and the rapid protection thereof as well as that of the lines which feed them, avoid the series connection of two apparatus each having a system of switches one of which carries out the on and off operation while the other ensures the protection; it is in fact known that such an association between two systems of switches requires a coordination which it is difficult to obtain because of the radically different properties which are required not only insofar as their closing powers are concerned, but also their opening speeds. This coordination is all the more delicate to achieve since each of these types of switches may be offered to the public by different suppliers and since their properties are not always known by the users.

THE PRIOR ART

In a known apparatus, corresponding to the general construction mentioned above, the striking devices and the magnetic devices which must respond to the appearance of excess currents of different values and duration use one and the same coil, so that the adjustments of the above-mentioned thresholds are not totally independent; moreover, this known apparatus is not concerned with the whole of the functions which it would be desirable to reserve for the local control.

When it is provided for the resetting of the apparatus to take place by means of a control, whether this be local or remote, it is necessary to take measures for providing total decoupling between members which ensure the automatic safety function and those which, either simultaneously or subsequently to an automatic break, must be actuated for opening the circuits and respectively putting the apparatus into service or putting it again into service; the aim of this decoupling is, on the one hand, to avoid a local closing action performed on the local control member, in the presence of a fault, from being followed by an effect and, on the other hand, to ensure that an automatic break causing the movement of certain indispensable parts is not accompanied by the movement of other mechanical elements not required for accomplishing the safety function.

OBJECT AND SUMMARY OF THE INVENTION

According to the invention, the result sought is attained because the local control is subjected to an internal elastic force and cooperates on the one hand with a first sudden tripping mechanism of which it forms part and which is adapted to retain it in a first stable position "F", given by external means, and which effects closure of the control switch for this single position "F", and on the other hand with a second sudden tripping mechanism, either so as to maintain a second stable position "O" which is given to the control member by external means, or so as to assume automatically a third stable position "D" located between the preceding ones, when the first mechanism is tripped by the second mechanism, the second mechanism being tripped by thrusts exerted without connection, either directly by a means reacting when the mobile contact of the power contact is locked following the energization of a first coil associated with the striker and placed in series with the power contact, or indirectly by a third sudden tripping mechanism which is released by the movements supplied by a plate of a second coil or respectively by a bimetallic strip, placed in series with the first coil and with the power contact, these second and third mechanisms receiving a resetting movement supplied by the local control member when this latter is brought by external means into a fourth position "R", which is opposite the first position.

BRIEF DESCRIPTION OF THE DRAWINGS

The invention, as well as other aims and other measures relating to complementary results such as matching to the current of use current detector members using coils and/or bimetallic strips which act on the third mechanism will be better understood from reading the following description.

In the accompanying drawings.

DESCRIPTION OF THE PREFERRED EMBODIMENT

Figure 1A:
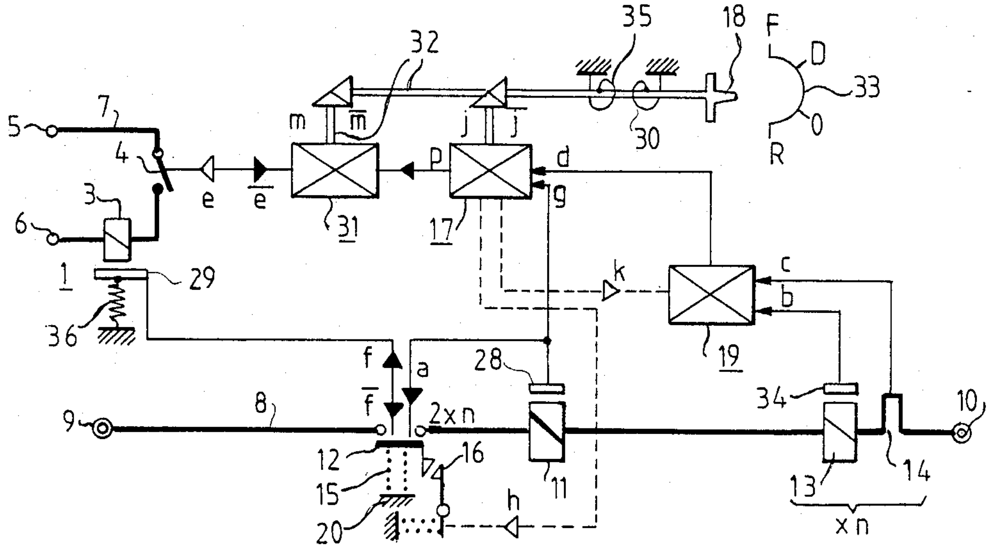
FIGS. 1*a* 1*b* show respectively first and second general electromechanical diagrams of the apparatus of the invention.

In FIG. 1*a*, an electromagnet 1 provides actuation of one or a multiplicity n of power contacts such as $2\times n$; this actuation is unidirectional because a return spring 36 of an armature 29 of this electromagnet pushes back, without connection, a mobile contact 12 of each power contact against the action of a contact pressure spring 15 which bears on the case 20 of the apparatus and which tends to close the contact; this unidirectional action is indicated by f when the armature is attracted and the contact is closed and $\bar{f}$ in the opposite case.

The electromagnet comprises a coil 3 which is placed in series with the control switch 4 in a control circuit 7 having terminals 6 and 5 adapted to receive an external voltage when the power contacts are to be closed.

The electromagnet and the power contacts are similar to those of a contactor with a view to effecting the corresponding functions.

A power circuit 8, passing through the power contact 2×n is connected between the connection terminals 10 and 9 for connection to a network and respectively to a consumer apparatus, not shown.

Circuit 8 comprises, in series with the contact 2×n, a coil 11 with which is associated a striker 28 which is moved very rapidly when the circuit has flowing therethrough currents such as those which appear during a full short circuit downstream of the apparatus.

This striker, in this case, may push back the mobile contact 12, independently of the armature of the electromagnet, as far as an open position in which the mobile contact is more distant from the fixed contact than in the open position which is provided by the springs of the armature. This action is indicated by the reference a.

In this position, the mobile contact 12 cooperates with a resilient bolt 16 which is adapted to retain it so as to prevent reclosure of the circuit after the appearance of such a fault.

Circuit 8 further comprises in series a second coil 13 which cooperates, in a way known per se, with a plate 34 or a plunger core, not shown, so as to communicate thereto a rapid movement shown by b, when there appear in this circuit high instantaneous currents such as those which are met with during overloads of short duration or when short circuits with limited current flow occur.

A bimetallic strip 14 is also placed in series in circuit 8 and supplies a deflection indicated by c when there appear in this circuit currents, smaller than the preceding ones, but of longer duration such as those which develop during small by prolonged overloads.

A first resettable sudden tripping mechanism 31 is associated mechanically by a transmission means, shown schematically by 32, to a local control member 18 and receives from this latter a unidirectional elastic force delivered by a spring 35.

This mechanism 31, of which the transmission means 32 forms part, is adapted to retain, by an action m, the local control member in a first stable position "F" which is communicated thereto from the outside, for example by manual action on this member; member 18 is released by an action $\overline{m}$ when this first mechanism 31 is tripped by internal means p of the apparatus which will be described subsequently.

This first mechanism 31 further governs the closing and opening states of control switch 4 through actions e and respectively $\overline{e}$, closing being provided only when this mechanism secures the position "F" of the control member.

When switch 4 is closed, the electromagnet 1 may be energized by an order signal applied to terminals 5 and 6 for closing the power contacts 2.

The control member 18 also cooperates, for example, through the same transmission 32, with a second sudden tripping mechanism 17 through contact actions shown by j. This second sudden tripping mechanism 17 is adapted to deliver the action p when it is tripped by one of the two movements g or d provided by internal means during an internal automatic opening procedure of the apparatus.

The action shown generally by g results from energization of coil 11 by a very high current and could thus be delivered by the striker 28 itself or by a plate (not shown) which would be associated with coil 11.

In a preferred embodiment of the invention, illustrated below, action g is delivered by bolt 16 as soon as this latter has assumed a position corresponding to the effective locking of the mobile contact 12, so that the appearance of action g corresponds effectively to the appearance, in coil 11, of a current of sufficient intensity for the striker to bring the mobile contact into a locked endmost open position.

The action shown by d is delivered by a third sudden tripping mechanism 19, when this latter is released by the appearance of one of the two actions b or c defined above. These two actions g and d are unidirectional, that is to say that they transmit movements without permanent connection of the two parts, preferably by a thrust. The two sudden tripping mechanisms 17, 19 are reset, one by the other, by means of local control member 18 through actions shown by $\overline{j}$ and respectively K when a particular resetting position "R" is communicated thereto; this resetting movement also exerts an unlocking action h transmitted by the second mechanism 17 for releasing the mobile contact 12 of the resilient bolt 16.

While the resetting operation is being carried out, which is transmitted from the second sudden tripping mechanism 17 to the third sudden tripping mechamism 19, switch 4 remains open.

Furthermore, resetting of the second mechanism 17 can only take place if the third mechanism 19 is in a condition to be reset, i.e. in the absence of actions b and c; as for the resetting position, switch 4 is open, the power contact 2×n is necessarily open so that only an action c developed by bimetallic strip 14, which is still hot, may in fact prevent immediate resetting of the second mechanism 19.

The local control member 18 moves between two opposite endmost positions, "F" corresponding to the closing of switch 4 and "R" corresponding to the resetting operation. A local external, for example manual, stable open position "O" of switch 4 is placed between these two endmost positions. This opening of switch 4 is achieved because, when the local control member leaves position "F", an action $\overline{m}$ is established between the transmission 32 and the first mechanism 31.

When a fault, of whatever nature it may be, appears in the power circuit 8, the second sudden tripping mechanism 17 immediately causes switch 4 to be opened by the first mechanism 31, but then assumes an intermediate tripped condition which confers on the local control member 18 by action j a stable intermediate position "D" located between positions "F" and "O"; this position cannot be given to the local control member by manual action thereon. Positions "F", "D" and "O" are then all three stable positions of the control member so that this member 18 restores not only an exact image of the states of the apparatus, but also informs the user about the nature of the events by which they were produced: local external action or internal automatic opening.

Position "R" is on the contrary unstable and can only be obtained by maintaining a permanent force, manual or otherwise, on the local control member and, possibly, against a second resilient action of a spring shown by 30.

If it is assume that the apparatus has been originally placed in the closed position "F" and that there then appears a short circuit current, the local control member assumes an automatic tripped condition "D"; resetting of the apparatus requires this control member to be moved, by external means, first of all to position "O" then to position "R" (and then brought to the position "F"). Since, for a fault of this nature, the bimetallic strip has not been sufficiently deformed and since coil 13 has not had sufficient time to act, the third mechanism 19 is not released, the second mechanism has first of all be reset (action $\bar{j}$) and has then been able to release the mobile contact 12 of its bolt 16 (action h); since switch 4 can only be closed by the first mechanism 31 because of action e when the local control member reaches position "F", this closure will cause (if voltage is still present at terminals 5, 6) energization of the electromagnet and so closure of the power contact 2. If the short circuit is still present, coil 11 will energize the striker 28 which will again open the mobile contact 12 and will cause release of the first sudden tripping mechanism, which will cause immediate reopening of switch 4 and so that of the power contacts 2. However, in the case of previous action mechanism 17, mechanism 31 maintains action $\bar{e}$ opening contact 4 so that the voluntary holding of member 18 in position F does not produce, should a permanent fault occur, the forced reclosure of contact 4.

If, on the contrary, the apparatus was originally placed in position "F" and if a slow overload then appears which causes the thermal deflection of the bimetallic strips 14, the control member assumes an automatic tripped position "D" but action c maintains its state during a certain time required for cooling these bimetallic strips.

A long as the bimetallic strips have not cooled down, neither the third sudden tripping mechanism 19 nor, consequently, the second mechanism 17 can be reset, when the control member 18 is placed in positon "R". The result is that, since action p is still present, the first sudden tripping mechanism 31 cannot be reset by an action m which will be communicated thereto by the control member 18 when this latter reaches position "F". In this case, the control member 18 takes up again position "D".

In the general diagram shown in FIG. 1*a*, the unlocking h and resetting k actions or movements communicated to bolt 16 and respectively to the third sudden tripping mechanism 19 follow separate paths from those which are followed by the tripping actions g and respectively d.

Figure 1B:
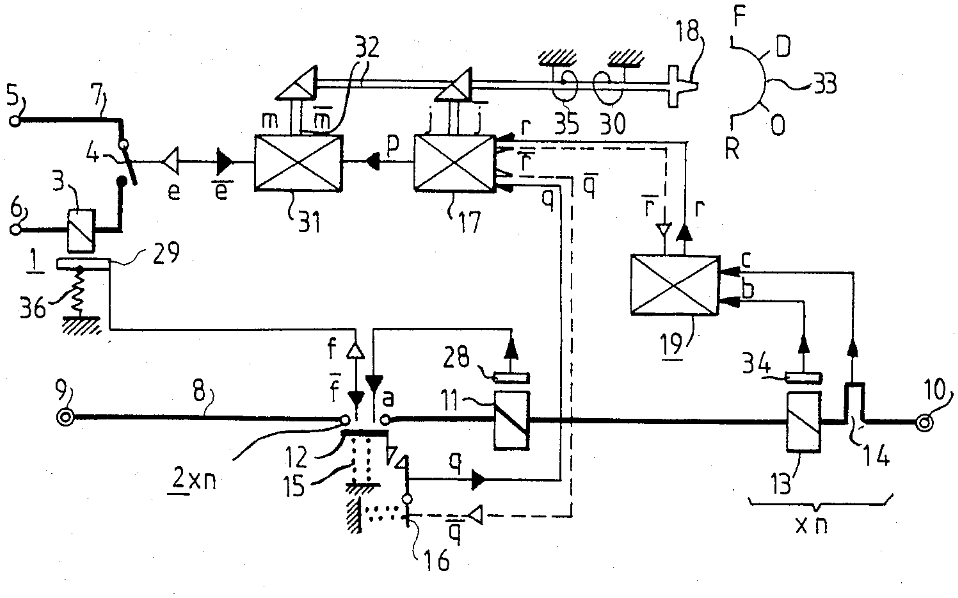

The invention includes however a variation shown in FIG. 1*b* in which the actions g and $\bar{h}$ respectively d and $\bar{K}$ are transmitted by two paths q, $\bar{q}$, and respectively r, $\bar{r}$ which thus use the same transmission means, shown by the continuous line and a dotted line.

As in the preceding cases, the transmission of orders q, $\bar{q}$, and that of orders r,r' must occur without mechanical connection between 11 and 17 or between 19 and 17, for example by a thrust. In the variation illustrated, bolt 16 transmits the action q to mechanism 17 and receives from this latter action $\bar{q}$; bolt 16 may in its turn lock either directly the mobile contact 12, or indirectly this latter, by engaging a part which communicates the movement thereto, for example the striker 28 or a rod for transmitting action a.

Figure 2:
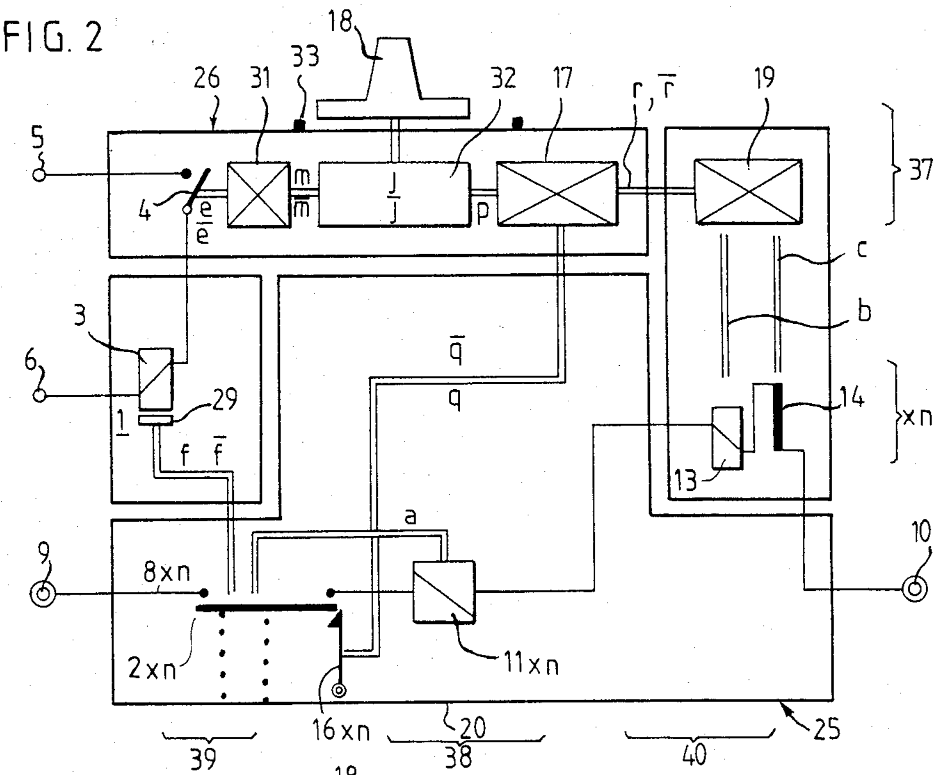
FIG. 2 illustrates a schematical view of the apparatus in which appear the different functions and the respective arrangement of the elements which provide them.

An advantageous embodiment of the apparatus of the invention is shown in FIG. 2 which illustrates how the different members are respectively arranged in a case and how they cooperate with each other.

The tripping mechanisms 31, 17 and 19 as well as the transmission means 32 are disposed in an upper region 37 of the case which has a front face 26 and the local control member 18 cooperating with a scale 13 indicating the positions "F", "D", "O" and "R".

The switching members comprising the power contacts 2, coils 11 and bolts 16 are distributed in a central region 38 and between this upper region 37 and a lower fixing face 25 opposite the front face 26.

The main parts of the electromagnet 1 common to all the contacts 2 are disposed in a first lateral region 39 between region 37 and the rear face 25.

The assembly of the coils 13 and bimetallic strips 14 is disposed in a second lateral region 40 opposite the first lateral region.

Figure 3:
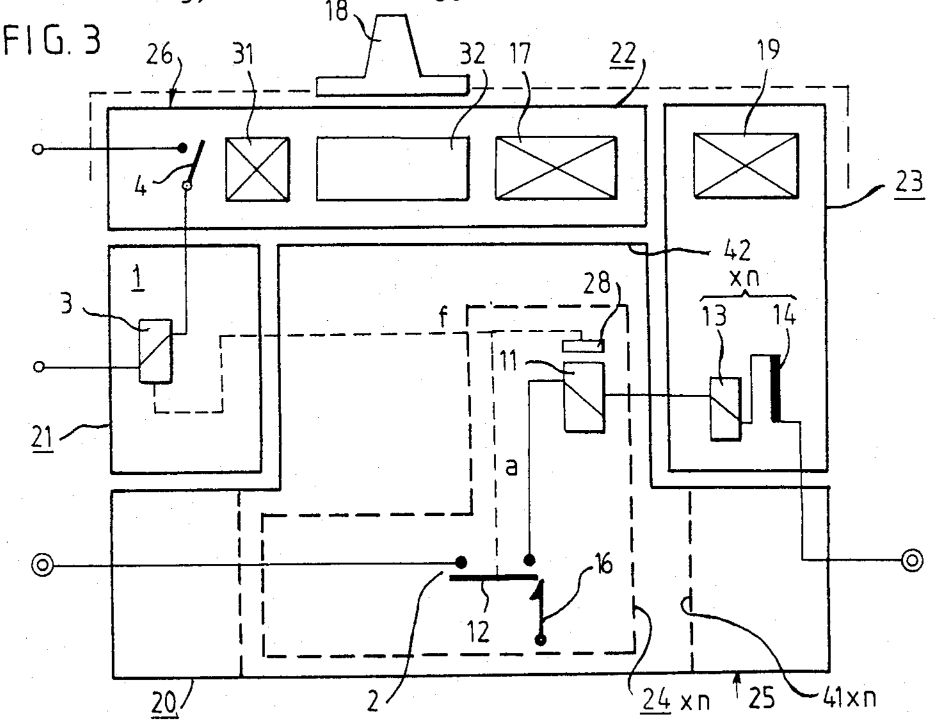
FIG. 3 shows schematically one embodiment where the apparatus is formed by the association of mechanical subassemblies mounted beforehand.
Figure 4:
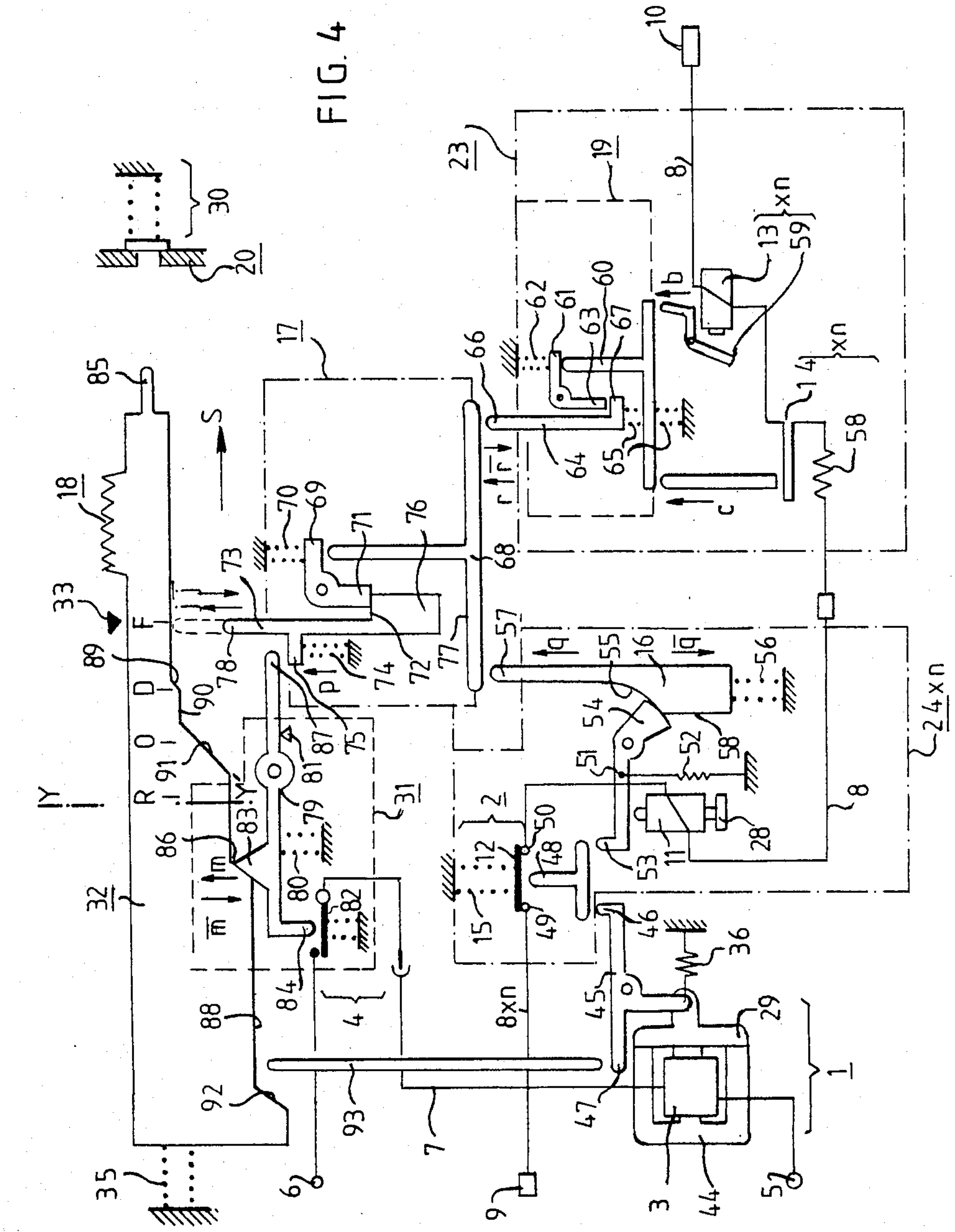
FIG. 4 shows a nonlimiting embodiment of the means used for achieving the different functions.

In an embodiment derived from FIG. 2 and shown in FIG. 3, the apparatus comprising several associated subassemblies namely: a base 20 having the rear face 25 in which opens a multiplicity n of pockets 41 adapted to receive removable cartridges 24 each comprising a power contact 2, a coil 11, a striker 28 and a bolt 16. A bearing surface 42 of the base receives a mechanical plate 22 containing the members 31, 32, 17, 18 and at least a fixed or mobile part of the control switch 4, which allows easy previous assembly of these members. A removable subassembly 21 placed laterally receives at least a part of the electromagnet 1 comprising for example a fixed yoke and giving access to coil 3 for replacement thereof, the coil being also able to come with this subassembly. The mobile parts of the electromagnet 1, such as the armature 29, the return spring 36 and a mobile part of pusher integral with, or driven by, the armature will then be fixed on the base of the apparatus so as to be located opposite the assembly of the mobile contacts 12 of the power contacts 2, adjustment screws disposed on this mobile pusher, respectively opposite each mobile contact, will further permit actuation of these contacts to be effected simultaneously.

in a more detailed diagram shown in FIG. 4, where the elements which have just been described bear the same references, the transmission principle shown symbolically in FIG. 1*b* is put into practice.

The electromagnet 1 comprises a fixed yoke 44 and a mobile armature 29 cooperates with a pusher 45 having a first arm 46 and a second arm 47. The first arm 46 acts on a first tripper device 48 adapted to separate the mobile contact 12 from the fixed contacts 49, 50 of the power contact 2. Striker 28 transmits its movement to a second pivoting pusher 51 having a spring 52 and having a first arm 53 adapted to raise the same tripper device 48, independently of 46; a second arm 54 cooperates with a surface 55 of a bolt 16 which is compressed by a spring 56 and which has a movement transmission end 57. A dotted line surrounded by 24 the parts which have just been described represents the contents of the power contact cartridge 24. When coil 11 attracts the rapid striker 28, the second pusher 51 is rocked and raises the tripper device 48. Because of the retraction of end 54, surface 55 is released and bolt 16 holds, by means of a lateral bearing surface 58, the second pusher 51 in the position which it has just assumed. At the same time, end 57 transmits an action q to the second sudden tripping mechanism 17.

A removable protection module 23 contains the bimetalic strips 14 and their heaters 58 as well as coils 13 and their plates 59. The deflections c and movements b are transmitted to the third sudden tripping mechanism 19, which comprises a pusher 60 receiving actions b and c and cooperating with a locking lever 61 subjected to the action of a spring 62 for locking and holding in position by its nose 63 a flange 67 which belongs to a rod 64. This latter is compressed by a spring 65 and has an end 66 adapted to communicate to the second sudden tripping mechanism 17 an action r.

The second sudden tripping mechanism 17 comprises a pusher 68 receiving the actions q and r and cooperating with a locking lever 69 subjected to a spring 70 for locking, by means of its nose 71, a flange 72 which belongs to a rod 73. This latter is compressed by a spring 74 and has, on the one hand, a heel 75 adapted to communicate to the first sudden tripping mechanism 31 and action p and, on the other hand, an end 76 placed opposite a surface 77 of pusher 68. Rod 73 further has an external pin 78 adapted to communicate and receive actions or movements j and respectively $\bar{j}$ by cooperation with mobile part 32.

The first sudden tripping mechanism 31 comprises a locking device 79 subjected to the action of a spring 80 which gives thereto a rest position by abutment against a stop 81. This lever 79 has an insulating pusher 84 adapted to open the mobile contact 82 of the control switch 4 and a locking tooth 83 adapted to cooperate with the mobile part 32 to communicate thereto and to receive therefrom actions m and $\bar{m}$. The mobile part 32 which is subjected to the action of return spring 35 and which is integral with the local control member 18 has a finger 85 adapted to cooperate with a spring 30 and, on the other hand, a multiplicity of ramps and surfaces adapted to cooperate with a tooth 83 and with the pin 78. In the position of part 32 corresponding to position "F" of the local control member, switch 4 is closed and, in the presence of a voltage signal at terminals 5,6, the armature 29 is attracted so that the power contacts 2 are also closed; the apparatus is thus brought into service. For this stable position, which has been provided by an external action on 18, a ramp 86 of 32 is applied resiliently in direction S against tooth 83 and is retained by this latter. The appearance of a fault, either by action q, or by action r, shifts the second mechanism 17 whose heel 75 raises the end 87 of lever 79. Cooperation of the tooth 83 and the inclined ramp 86 causes sudden tripping of 31 which opens switch 4 and releases part 32; in this movement, tooth 83 then comes to bear on a holding surface 88 of part 32 and lever 79 is in a working position in which switch 4 remains open. When heel 75 has moved, pin 78 has taken up a higher position, shown with a dotted line, which allows it to cooperate with a second inclined ramp 89 when this latter moves in direction S; part 32 is thus stopped by the pin in a stable position "D" corresponding to the appearance of a fault.

If an external action is communicated in direction S to the control member 18, the ramp 89 escapes from the pin, which it pushes back slightly, so that this latter, after sliding against surface 90, comes into abutment against the beginning of a third inclined ramp 91; part 32 is then held in a stable position "O" corresponding to opening of the apparatus by external means. In this position "O", finger 85 comes into the neighbourhood of spring 30. If a movement in direction S is imparted to the part 32 by the control member 18, this latter may reach an unstable position "R" opposite "F" in which spring 30 is compressed; in this latter movement, the inclined ramp 91 exerts on pin 78 a resetting action $\bar{j}$ which pushes it back downwards of the figure. The movement of rod 73 is transmitted by heel 76 to the surface 77 and to pusher 68 which, in its turn, transmits the movement received to ends 57 and 66. The second sudden tripping mechanism 17 is reset during this operation when nose 71 catches on flange 72. The movements of bolt 16 and rod 64 then allow, on the one hand, bolt 54 to be unlocked and contact 2 to be closed and, on the other hand, the third mechanism 19 to be reset if the bimetallic strips have cooled down. If, in the presence of a non-cooled bimetallic strip, a movement is imparted to part 32 from position "R" to position "F", tooth 83 of locking lever 79 will remain in a working position under the effect of the thrust P of heel 75, mechanisms 17, 19 not having been able to be reset. For this working position of lever 79, tooth 83 cannot cooperate with ramp 86 so that switch 4 will remain open and power contacts 2 cannot close. The only stable position which the local control member 18 may assume will then be the position "D", or the position "0" if a corresponding action is exerted on this member.

Accessorily, the apparatus may be used for putting into effect measures for effecting forced opening of the power contacts 2, more especially should they be welded together. Such forced opening is achieved automatically by a procedure set off by a fault, or by an action, for example manual, on the local control member, between positions "F" and "0". To this end, part 32 has a fourth ramp 92 adapted to cooperate between positions "F" and "O", with a transmission rod or other means 93 for exerting on the arm 47 of lever 45 an action comparable to that which is exerted by spring 36, but of a greater strength. A voluntary movement of part 32 in direction S, by action on the control member 18, may obviously be obtained from position "F" towards position "O" to make the apparatus inoperative. During this operation, ramp 86 pushes back tooth 83 while causing abrupt rocking of the lever which produces instantaneous opening of switch 4.

It should moreover be understood that, although in FIG. 4 the surfaces or ramps 88, 86, 89, 90, 91 have been physically separated so as to make their respective functions clearer, some of them could be combined so as to make the construction of part 32 simpler; such a combination would for example be possible if tooth 83 and pin 73 were placed closer to one another or if their movements were not parallel.

The movements, assumed rectilinear in FIG. 4, may be obtained by means of guide surfaces not shown; movements along adjacent or curved paths could also be used and obtained by known means, for example if part 32 is a disc carrying the ramps and pivoting about an axis YY'.

Generally, the invention may be implemented by using locking or tripping means which provide the same functions or which react in a way comparable to those which have been shown schematically by way of non-limiting example.

We claim:

1. A contactor apparatus comprising:

i power circuit means for supplying current to a load including a plurality of power switch means in said circuit and, for each of said switch means, a first protection means actuated by the occurrence of a short circuit current through the power circuit means, second and third protection means respectively actuated by the occurrence of second and third types of overload current having an intensity substantially lower than that of a short circuit current, with the third type of overload current having a substantially longer duration than that of the second type, the first protection means, when actuated, triggering said power switch means into an open position to disconnect the circuit from the load;

ii control circuit means including a control switch serially connected with electromagnet means, said electromagnet means, when energized through said control circuit means, controlling the opening of one of said power switch means; and a spring means normally resetting the control switch into a closed position after opening of the one switch means;

iii local control means for controlling one of said switches comprising a mechanical control member having camming surface portions and mounted for displacement along a predetermined path successively from first to second and third positions against the action of an external force such as spring means for resetting the said mechanical member into its first position;

iv a transmission member operated by said local control means having a locking surface portion which contacts a first one of said camming surface portions of the mechanical control member for retaining it in its third position when the said mechanical control member has been set into the said third position under the action of the external force, the said transmission member further having a control surface portion which acts upon the control switch to open the same when the mechanical control member is not in its third position;

v first, second and third snap acting tripping mechanisms each having a cocked and a released position, with spring means normally pushing the said second and third mechanisms into their cocked position, each of said second and third mechanisms automatically passing from the cocked to the released position under the action of a releasing force and from the released to the cocked position under the action of cocking force, the releasing and cocking forces having opposite directions, the first tripping mechanism being positioned by a second one of said camming surface portions when the mechanical control member is in its first position to receive the cocking force therefrom and having a control surface portion which, in the released position of the first tripping mechanism, cooperates with the transmission member to unlock the said locking surface portion from the said first camming surface portion; the second and third tripping mechanism also receiving their cocking force when the mechanical control member is in its first position, the second tripping mechanism being set into its released position by the first protection means when the first protection means is actuated and then applying a releasing force to the first tripping mechanism from its cocked position;

vi release means for the third tripping mechanism, said release means having an actuated position in which they are set by any one of the second and third protection means when any one of the second and third protection means is actuated and then applying a releasing force to the third tripping mechanism, the third tripping mechanism, when in its released position, applying a releasing force to the first tripping mechanism from its cocked position, the camming surface portions of the mechanical control member including a third camming surface portion which stops the displacement of the mechanical control member from its third position to its second position through abutment of the third camming surface portion with the first tripping mechanism.

2. A contactor apparatus as claimed in claim 1, wherein a cocking force is applied to the second and third tripping mechanisms by the first tripping mechanism when the first tripping mechanism is in its cocked position.

3. A contactor apparatus as claimed in claim 1, wherein the second tripping mechanism, when in its released position, further locks the power switch means into the open position thereof.

4. A contactor apparatus as claimed in claim 1, wherein the local control means further comprises a movable abutting member which cooperates with the said mechanical control member for stopping the said mechanical control member in a fourth position intermediate between the second and first positions and spring means bearing on said movable abutting member and allowing further displacement of the said mechanical control member from its second to its fourth position through compression of the said spring means under the action of the said external force.

5. A contactor apparatus as claimed in claim 4, wherein the control circuit means further comprises lever means having an actuated position in which it controls a forced opening of the power switch means; the mechanical control member has a fourth camming surface portion and a movement transmission means cooperates with said fourth camming surface portion and with said lever means to effect forced opening of the power switch means when the mechanical control member is between its third and fourth positions.

6. A contactor apparatus as claimed in claim 1, said contactor apparatus comprising a base forming a plurality of inner chambers, a corresponding plurality of cartridges housed in the respective chambers and respectively lodging the respective power switch means, first protection means and second snap acting tripping mechanisms.

7. A contactor apparatus as claimed in claim 6, said contactor apparatus further comprising a removable module containing a respective plurality of second and third protection means and of third snap acting tripping mechanisms.

8. A contactor apparatus as claimed in claim 7, said contactor apparatus further comprising a further removable module housing the said mechanical control member, the transmission member and the first snap acting tripping mechanism.

9. A contactor apparatus as claimed in claim 8, wherein the control switch has fixed and movable contacts and said further removable module further houses at least part of the said fixed and movable contacts.

10. A contactor apparatus as claimed in claim 9, said contactor apparatus further comprising a removable subassembly containing at least part of the electromagnet means.

* * * * *